(12) United States Patent
Johar et al.

(10) Patent No.: US 12,130,693 B2
(45) Date of Patent: Oct. 29, 2024

(54) ADAPTABLE WORKLOAD SYSTEM

(71) Applicant: Google LLC, Mountain View, CA (US)

(72) Inventors: Gobind Jit Singh Johar, San Jose, CA (US); Stephen James Muir, Cambridge, MA (US); Philip William Stoneman, London (GB); William Mark Pulford, Sydney (AU); Jonathon Buckley, Seattle, WA (US); Bodie William Francis, Arvada, CO (US); Andrew Oates, Somerville, MA (US)

(73) Assignee: Google LLC, Mountain View, CA (US)

( * ) Notice: Subject to any disclaimer, the term of this patent is extended or adjusted under 35 U.S.C. 154(b) by 143 days.

(21) Appl. No.: 17/657,348

(22) Filed: Mar. 30, 2022

(65) Prior Publication Data
US 2023/0315551 A1 Oct. 5, 2023

(51) Int. Cl.
*G06F 11/00* (2006.01)
*G06F 9/50* (2006.01)
(Continued)

(52) U.S. Cl.
CPC .......... *G06F 11/008* (2013.01); *G06F 9/5077* (2013.01); *G06F 11/3006* (2013.01);
(Continued)

(58) Field of Classification Search
CPC ............... G06F 11/008; G06F 11/3409; G06F 11/3006; G06F 9/50; G06F 9/505; G06F 9/5027; G06F 9/5077
See application file for complete search history.

(56) References Cited

U.S. PATENT DOCUMENTS

| 2003/0051187 A1* | 3/2003 | Mashayekhi ....... G06F 11/2035 |
| | | 714/E11.073 |
| 2011/0077795 A1* | 3/2011 | VanGilder ............... G06F 1/206 |
| | | 700/300 |

(Continued)

OTHER PUBLICATIONS

International Search Report and Written Opinion for related PCT Application No. PCT/US2023/034972, dated May 19, 2023.

*Primary Examiner* — Yolanda L Wilson
(74) *Attorney, Agent, or Firm* — Honigman LLP; Brett A. Krueger

(57) ABSTRACT

A method includes determining a cluster reliability of a computing cluster including a maximum computing capacity and representative of a reliability of the computing cluster when utilizing an entirety of the maximum computing capacity. The operations include receiving a provisioning request of the computing cluster including a threshold reliability of the computing cluster. In response to the provisioning request, determining, using the cluster reliability, a reserved computing capacity of the computing cluster based on the threshold reliability. The reserved computing capacity is less than the maximum computing capacity. Based on the reserved computing capacity and the maximum computing capacity, the operations include determining an unreserved computing capacity of the computing cluster. The operations include provisioning the computing cluster for execution of a user workload. The user workload executes on the unreserved computing capacity. The reserved computing capacity is initially unavailable for executing the user workload.

18 Claims, 9 Drawing Sheets

(51) Int. Cl.
  *G06F 11/30* (2006.01)
  *G06F 11/34* (2006.01)
(52) U.S. Cl.
  CPC .. *G06F 11/3409* (2013.01); *G06F 2209/5022* (2013.01); *G06F 2209/505* (2013.01); *G06F 2209/508* (2013.01)

(56) References Cited

U.S. PATENT DOCUMENTS

2012/0151358 A1* 6/2012 Joanny .................. G06F 9/5011
                                                 709/226
2013/0091282 A1* 4/2013 Tontiruttananon .... G06F 9/5061
                                                 709/226
2014/0019961 A1* 1/2014 Neuse .................... G06F 9/5077
                                                 718/1
2019/0384668 A1* 12/2019 Aiyar .................. G06F 11/0709

* cited by examiner

ADAPTABLE WORKLOAD SYSTEM

TECHNICAL FIELD

This disclosure relates to an adaptable workload system.

BACKGROUND

Service-level objectives (SLO) are integral elements of service-level agreements (SLAs) that define the means for measuring performance. For example, SLOs may be used to define how performance is measured for a service provider providing hardware and/or software for a customer to execute workloads. These SLOs generally are structured toward the service associated with the platform (i.e., the hardware and software) and do not have specific applications for any workload running on top of the service. Thus, workloads have to be adapted to fit guarantees regarding uptime for the platform Uptime refers to the time during which the platform is in operation. Uptime typically remains static relative to the workload running on the SLO.

SUMMARY

One aspect of the disclosure provides a computer-implemented method for an adaptable workload system that, when executed by data processing hardware, causes the data processing hardware to perform operations. The operations include determining a cluster reliability of a computing cluster that includes a maximum computing capacity. The cluster reliability is representative of a reliability of the computing cluster when utilizing an entirety of the maximum computing capacity. The operations also include receiving a provisioning request from a user requesting provisioning of the computer cluster. The provisioning request includes a threshold reliability of the computing cluster. In response to receiving the provisioning request, a reserved computing capacity of the computing cluster is determined using the cluster reliability of the computing cluster and based on the threshold reliability of the computing cluster. The reserved computing capacity is less than the maximum computing capacity. The operations also include determining, based on the reserved computing capacity of the computing cluster, an unreserved computing capacity of the computing cluster. The computing cluster is provisioned for execution of a user workload associated with the user, and the execution of the user workload is executed on the unreserved computing capacity of the computing cluster. The operations further include reserving the reserved computing capacity of the computing cluster. The reserved computing capacity of the computing cluster is initially unavailable for execution of the user workload.

Implementations of the disclosure may include one or more of the following optional features. In some implementations, the threshold reliability includes an uptime percentage of the computing cluster. Optionally, the operations include detecting a failure of the computing cluster. The failure affects the unreserved computing capacity. In these examples and in response to detecting the failure, the operations include designating at least a portion of the reserved computing capacity as available for execution of the user workload.

In some examples, the computing cluster includes a plurality of components, and determining the cluster reliability of the computing cluster includes, for each respective component of the plurality of components, determining a respective component reliability and aggregating each respective component reliability. In some implementations, determining the reserved computing capacity of the computing cluster includes receiving, from the user, a threshold reliability update request including a second threshold reliability Optionally, the threshold reliability can be adjusted based on the second threshold reliability.

After provisioning the computing cluster, in some examples, the operations include monitoring for a failure affecting the unreserved computing capacity. In some examples, the computing cluster includes a plurality of nodes, and reserving the reserved computing capacity of the computing cluster includes tainting one or more nodes of the plurality of nodes. Each respective node of the plurality of nodes may include a maximum node computing capacity, and reserving the reserved computing capacity of the computing cluster may include establishing, for each respective node of the plurality of nodes, a computing capacity limit that is less than the maximum node computing capacity of the respective node. In some implementations, the operations further include detecting a failure of one respective node of the plurality of nodes, and in response to detecting the failure, removing the computing capacity limit from at least one respective node of the plurality of nodes. Optionally, the operation of receiving the provisioning request includes receiving, in a graphical user interface executing on the data processing hardware for display on a screen in communication with the data processing hardware, a user input indication indicating selection of a graphical element to set the threshold reliability.

Another aspect of the disclosure provides a system for an adaptable workload. The system includes data processing hardware and memory hardware in communication with the data processing hardware. The memory hardware stores instructions that when executed on the data processing hardware cause the data processing hardware to perform operations. The operations include determining a cluster reliability of a computing cluster that includes a maximum computing capacity. The cluster reliability is representative of a reliability of the computing cluster when utilizing an entirety of the maximum computing capacity. The operations also include receiving a provisioning request from a user requesting provisioning of the computer cluster. The provisioning request includes a threshold reliability of the computing cluster. In response to receiving the provisioning request, a reserved computing capacity of the computing cluster is determined using the cluster reliability of the computing cluster and based on the threshold reliability of the computing cluster. The reserved computing capacity is less than the maximum computing capacity. The operations also include determining, based on the reserved computing capacity of the computing cluster, an unreserved computing capacity of the computing cluster. The computing cluster is provisioned for execution of a user workload associated with the user, and the execution of the user workload is executed on the unreserved computing capacity of the computing cluster. The operations further include reserving the reserved computing capacity of the computing cluster. The reserved computing capacity of the computing cluster is initially unavailable for execution of the user workload.

This aspect may include one or more of the following optional features. In some implementations, the threshold reliability includes an uptime percentage of the computing cluster. Optionally, the operations include detecting a failure of the computing cluster. The failure affects the unreserved computing capacity. In these examples and in response to detecting the failure, the operations include designating at least a portion of the reserved computing capacity as available for execution of the user workload.

In some examples, the computing cluster includes a plurality of components, and determining the reliability of the computing cluster includes, for each respective component of the plurality of components, determining a respective component reliability and aggregating each respective component reliability. In some implementations, determining the reserved computing capacity of the computing cluster includes receiving, from the user, a threshold reliability update request including a second threshold reliability. Optionally, the threshold reliability can be adjusted based on the second threshold reliability.

After provisioning the computing cluster, in some examples, the operations include monitoring for a failure affecting the unreserved computing capacity. In some examples, the computing cluster includes a plurality of nodes, and reserving the reserved computing capacity of the computing cluster includes tainting one or more nodes of the plurality of nodes. Each respective node of the plurality of nodes may include a maximum node computing capacity, and reserving the reserved computing capacity of the computing cluster may include establishing, for each respective node of the plurality of nodes, a computing capacity limit that is less than the maximum node computing capacity of the respective node. In some implementations, the operations further include detecting a failure of one respective node of the plurality of nodes, and in response to detecting the failure, removing the computing capacity limit from at least one respective node of the plurality of nodes. Optionally, the operation of receiving the provisioning request includes receiving, in a graphical user interface executing on the data processing hardware for display on a screen in communication with the data processing hardware, a user input indication indicating selection of a graphical element to set the threshold reliability.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 2A and 213 are schematic views of a computing cluster with unreserved and reserved computing capacities.

Like reference symbols in the various drawings indicate like elements.

DETAILED DESCRIPTION

Figure 1:
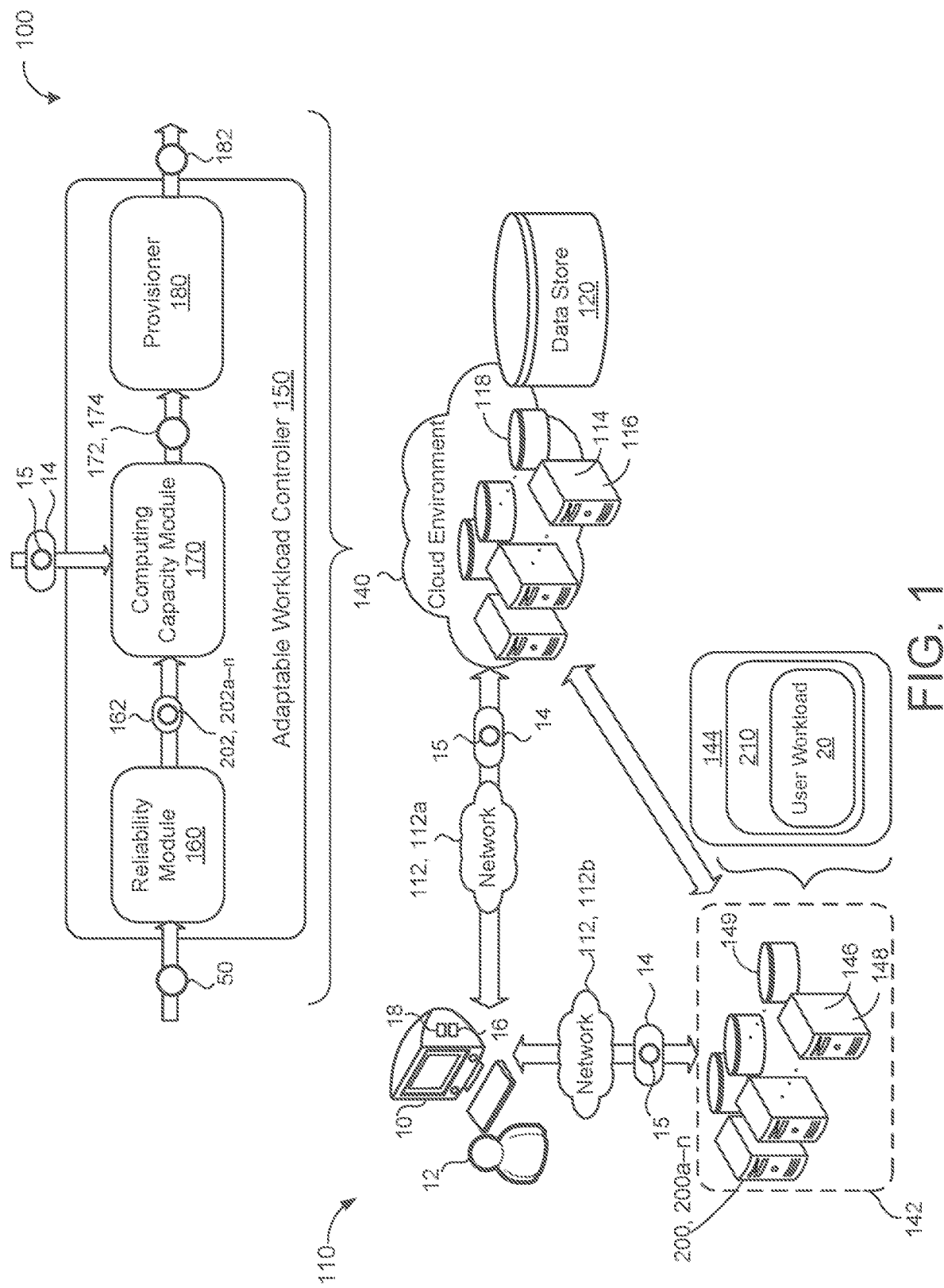
FIG. 1 is a schematic view of an example system for an adaptable workload.

Service level objectives (SLO) are integral elements of service-level agreements (SLAs) that define the means for measuring performance. For example, a service level objective (SLO) may govern measurement of the performance of a container orchestration platform for one or more of computing clusters. The SLO may govern the monitoring and provisioning the computing cluster to meet a specific uptime, where the uptime is the time in which the computing cluster is in operation (i.e., usable by the customer). However, conventional SLOs typically apply to a service and not a user workload that may be running on top of the service. As a result, the SLO becomes a one-size-fits all service, which results in adapting the user workload to fit within the uptime parameters set forth in the SLO. For example, the uptime is typically static relative to the workload running on the SLO. Adapting the user workload to the SLO can limit customizability of the SLO and, while some user workloads may adapt easily to the service limitations, some user workloads may lag or otherwise operate inefficiently as a result.

Implementations herein are directed toward an adaptable workload system that automatically adapts to implement a dynamic SLO (e.g., adjusted by a user) for executing user workloads. Stated differently, the system allows, for example, the user to adjust the SLO to the user workload rather than the service. The user can choose, via the adaptable workload system, the SLO that best suits the user workload, and the system adjusts the capabilities of the service in response. For example, the system may adapt to selectively prioritize user workloads when resources are limited. Specifically, a hardware failure may result in the system adapting the service to accommodate for the capacity requirements of the user workload Stated differently, the SLO is a property that can be modulated by the user based on current workload needs. This configuration of the SLO can result in dynamic changes adapted to assist in, for example, uptime guarantee provisions set by the user. For example, the user may use the service governed by the SLO for development, which requires a lower uptime guarantee as compared to when the service is used for a production workload.

As the user adjusts the SLO, the service is configured as part of an adaptable workload system, as the adaptable workload system identifies differences (e.g., in uptime guarantees) based on the SLO adjustment. For example, the system can automatically adapt the service as the user adjust the SLO based on current workload needs to effectively update and adjust an uptime guarantee. This allows the user to effectively select the SLO that best fits the current workload requirements. The service may be configured via both a control plane and a data plane.

In some examples, the adaptable workload system dynamically adjusts service aspects of both the control plane and the data plane. In other examples, the adaptable workload system dynamically only adjusts a portion of the system (e.g., the data plane). For example, the data plane of the service refers to the computing capacity of the computing cluster the user uses to execute workloads. In this example, the data plane executes with a sliding scale of uptime based on node capacity on the computing cluster. Stated differently, the system determines an appropriate computing capacity based on the SLO adjusted or selected by the user and adjusts the available capacity of the computer cluster appropriately.

Referring to FIG. 1, in some implementations, an example adaptable workload system 100 includes a remote system 140 in communication with one or more user devices 10 via a network 112. The remote system 140 may be a single computer, multiple computers, or a distributed system (e.g., a cloud environment) having scalable/elastic resources 114 including computing resources 116 (e.g., data processing hardware) and/or storage resources 118 (e.g., memory hardware). A data store 120 (i.e., a remote storage device) may be overlain on the storage resources 118 to allow scalable use of the storage resources 118 by one or more of the clients (e.g., the user device 10) or the computing resources 116.

The remote system 140 is configured to receive a provisioning request 14 from a user device 10 associated with a respective user 12 via, for example, a network 112, 112a. The user device 10 may correspond to any computing device, such as a desktop workstation, a laptop workstation, or a mobile device (i.e., a smart phone). The user device 10 includes computing resources 16 (e.g., data processing hardware) and/or storage resources 18 (e.g., memory hardware).

The user 12 executes one or more user workloads 20 on a computing cluster 142 as part of a service 110 provided by the adaptable workload system 100. The computing cluster 142 includes one or more nodes 200, 200a-n each including computing resources 146 (e.g., data processing hardware) and/or storage resources 148 (e.g., memory hardware). A node data store 149 may be overlain on the storage resources 148. In some examples, the computing cluster 142 includes on-premises hardware associated with the user 12. In this example, the user device 10, the remote system 140, and the computing cluster 142 communicate via one or more networks 112 such as a public network 112a and a private or local network 112, 112b. In other examples, the computing cluster 142 is a part of the remote system 140 (i.e., cloud computing). A control plane of the service 110 may execute on the remote system 140 while a data plane of the service 110 may execute on the computing cluster.

The computing cluster 142 has a maximum computing capacity 144 and each node 200 of the computing cluster 142 has a maximum node computing capacity 210. Each node 200 may have a different maximum node computing capacity 210 and in general, the maximum computing capacity 144 of the computing cluster 142 is a sum of the maximum node computing capacity 210 of each node 200. The user workload 20, when executing, uses a portion of the maximum computing capacity 144 and portions of one or more maximum node computing capacities 210 depending on the number of nodes 200 the user workload 20 is distributed across.

The remote system 140 (or, in some examples, the computing cluster 142) executes an adaptable workload controller 150. The adaptable workload controller 150 includes a reliability module 160 that determines a cluster reliability 162 of the computing cluster 142 and/or the nodes 200. For example, the reliability module 160 receives cluster information 50 that includes information regarding the computing cluster 142 and/or the nodes 200 of the computing cluster 142 such as types, manufacturers, model numbers, and quantities of various components of the nodes 200 and/or computing cluster 142. Using the cluster information 50, the reliability module 160 determines the cluster reliability 162 of the computing cluster (e.g., a mean time to failure (MTTF)). In some implementations, the reliability module 160 determines a node reliability 202, 202a-n for each node 200 and the cluster reliability 162 is an aggregation of each node reliability 202. For purposes of simplicity, the adaptable workload controller 150, and the adaptable workload system 100 more generally, is described in relation to the computing clusters 142. However, it is contemplated that the operations described herein may also apply to the nodes 200 of the computing cluster 142.

The cluster reliability 162 of the computing cluster 142 may be representative of the cluster reliability 162 of the computing cluster 142 when an entirety of the maximum computing capacity 144 of the computing cluster 142 is required (i.e., any event that reduces the maximum computing capacity 144 is considered failure). For example, when the computing cluster 142 includes a plurality of nodes 200, a failure of any single node 200 would result in reducing the maximum computing capacity 144. It is generally contemplated that the cluster reliability 162 of the computing cluster 142 may relate to the MTTF of the computing cluster 142. The adaptable workload controller 150 automatically adjusts availability of a portion of the maximum computing capacity 144 of the computing cluster 142 based on the determined cluster reliability 162, as described further below.

As illustrated in FIG. 1, the adaptable workload controller 150 receives the provisioning request 14 requesting provisioning of the computing cluster 142 from the user 12 via the network 112. The provisioning request 14, in some examples, includes a threshold reliability 15 of the computing cluster 142. The threshold reliability 15 may include an uptime percentage of the computing cluster 142.

In addition to the reliability module 160, the adaptable workload controller 150 of the adaptable workload system 100 includes a computing capacity module 170 and a provisioner 180. The computing capacity module 170 receives the provisioning request 14 from the user 12 and the cluster reliability 162 from the reliability module 160 and determines a reserved computing capacity 172 of the computing cluster 142. As described in more detail below, the reserved computing capacity 172 represents an amount of computing capacity that must be reserved (based on the cluster reliability 162) in order to satisfy the threshold reliability 15.

The reserved computing capacity 172 is less than the maximum computing capacity 144, and the computing capacity module 170 determines the reserved computing capacity 172 based on the threshold reliability 15 of the computing cluster 142 and the cluster reliability 162. Stated differently, in response to receiving the provisioning request 14, the computing capacity module 170 determines the reserved computing capacity 172 of the computing cluster 142 using the cluster reliability 162 and the threshold reliability 15 of the computing cluster 142. The computing capacity module 170 also determines an unreserved computing capacity 174 that is based on the maximum computing capacity 144 and the reserved computing capacity 172. For example, the reserved computing capacity 172 is subtracted from the maximum computing capacity 144 to determine the unreserved computing capacity 174 of the computing cluster 142. It is understood that the computing capacity module 170 could alternatively first determine the unreserved computing capacity 174 and derive the reserved computing capacity 172 from the unreserved computing capacity 174.

The provisioner 180 provisions the computing cluster 142 to execute the user workload 20 associated with the user 12. The user workload 20 is initially executed only on the unreserved computing capacity 174 of the computing cluster 142. That is, the provisioner 180 provisions the computing cluster 142 such that only an amount of computing capacity of the computing cluster 142 equal to the unreserved computing capacity 174 is available for executing the user workload 20. The reserved computing capacity 172 of the computing cluster 142 is reserved for potential later use (e.g., in case of a failure). That is, the reserved computing capacity 172 of the computing cluster 142 is initially unavailable for execution of the user workload 20 (i.e., in order to satisfy the threshold reliability 15), but may be made available at a later time. The provisioner 180 issues one or more provisioning commands 182 to provision the computing cluster 142.

Figure 2A:
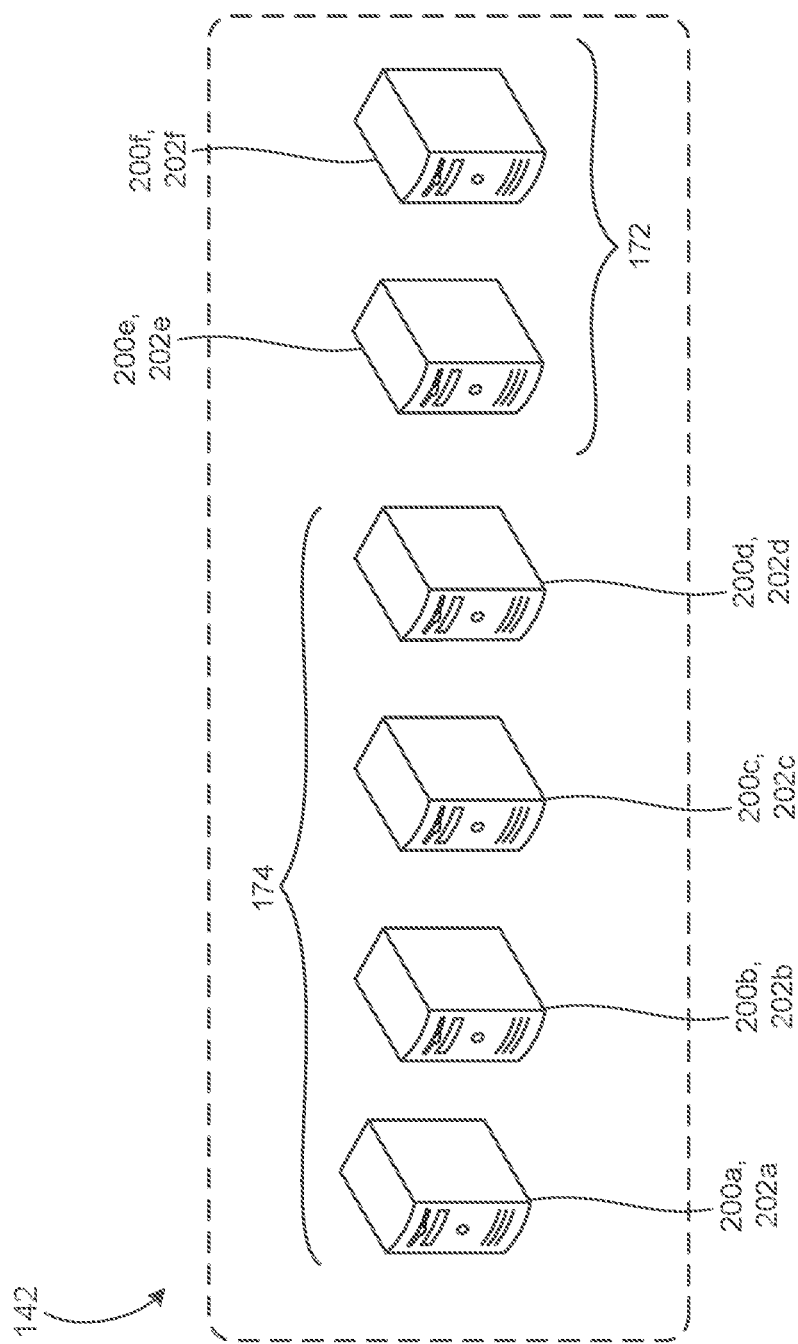

Referring now to FIG. 2A, the computing cluster 142, in this example, includes six nodes 200a-f, although in practice the cluster 142 may include any number of nodes 200. The reliability module 160 (FIG. 1) may determine a respective node reliability 202, 202a-f for each respective node 200a-f of the one or more nodes 200. The respective node reliability 202 of each of the respective nodes 200a-f may be aggregated when determining the cluster reliability 162 of the computing cluster 142. In some examples, the reliability module 160 determines the node reliability 202 for each node 200 based on one or more component reliabilities of components that make up the nodes 200 (e.g., CPUs, RAM, non-volatile storage, network interfaces, etc.). The respective node reliabilities 202 (and/or component reliabilities) may be subsequently utilized by the computing capacity module 170 (FIG. 1) to determine the reserved and unreserved computing capacities 172, 174.

In some implementations, the reserved computing capacity 172 refers to reserving at least one of the plurality of nodes 200a-f from executing the user workload 20. Reserving a node 200 may be accomplished by "tainting" a node 200. In some examples one or more of the nodes 200a-f is tainted resulting in the reserved computing capacity 172. For example, FIG. 2A illustrates two nodes 200e, 200f that the adaptable workload controller 150 reserves to represent the reserved computing capacity 172, while the four nodes 200a-d of the computing cluster 142 represent the unreserved computing capacity 174 that may execute the user workload 20. That is, in this example, the reserved computing capacity 172 is created by reserving one or more entire nodes 200 from executing the user workload 20. It is contemplated that the reserved computing capacity 172 may include greater or fewer than two nodes 200 and that the unreserved computing capacity 174 may include greater or fewer than four nodes 200.

Figure 2B:
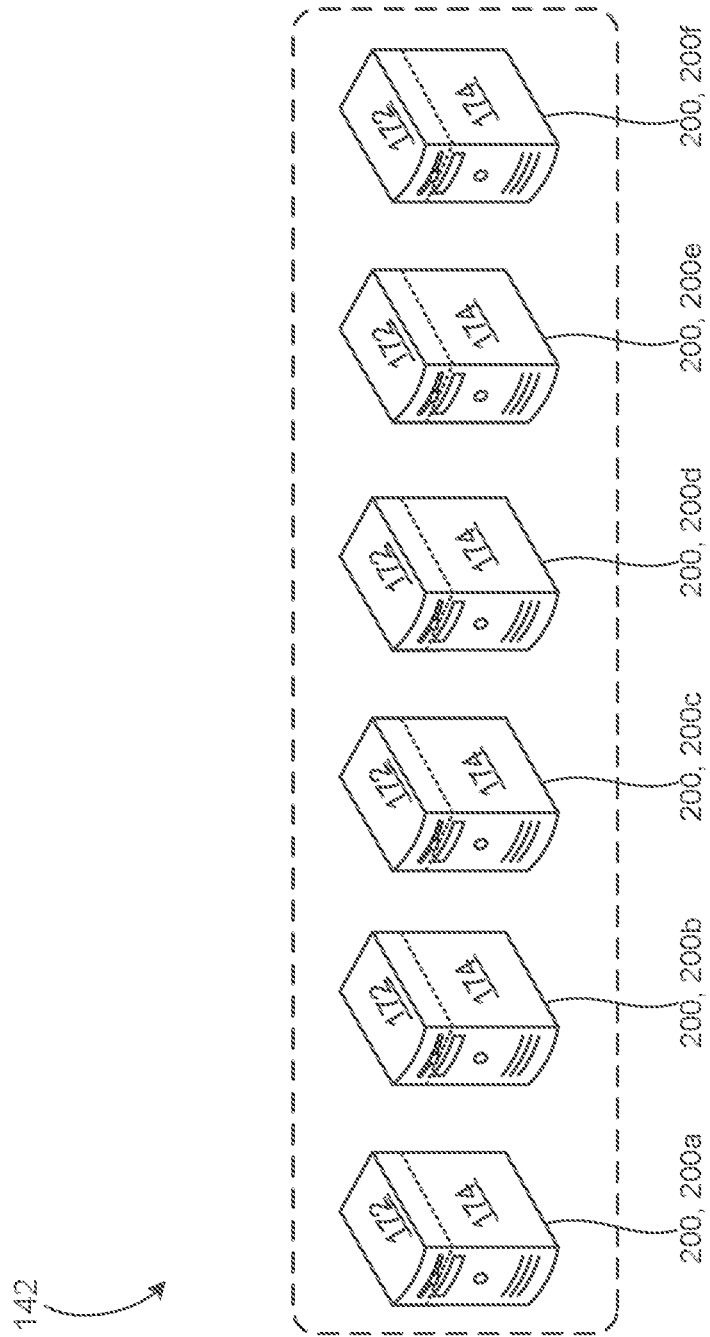

Additionally or alternatively, as illustrated in FIG. 2B, the reserved computing capacity 172 and the unreserved computing capacity 174 may be enforced or applied to each node 200 of the computing cluster 142 individually. In these implementations, a portion or percentage of the maximum node computing capacity 210 of each node 200 of the computing cluster 142 is designated as the reserved computing capacity 172 and the remainder is designated as the unreserved computing capacity 174. That is, in these examples, each node 200 reserves a respective portion of its maximum node computing capacity 210. For example, when reserving 20% of the maximum computing capacity 144 of the computing cluster, each node 200 reserves 20% of their respective maximum node computing capacity 210. The unreserved computing capacity 174 of the computing cluster 142 is distinguished from the reserved computing capacity 172 in FIG. 2C by the dashed line represented on each node 200 of the computing cluster 142. For example, the reserved computing capacity 172 is illustrated as the upper region of the node 200, and the unreserved computing capacity 174 is illustrated as the lower region of the node 200. While not shown here, one or more nodes 200 may be tainted or otherwise entirely reserved from operation in addition to each node reserving a portion of the maximum node computing capacity 210.

Figure 3:
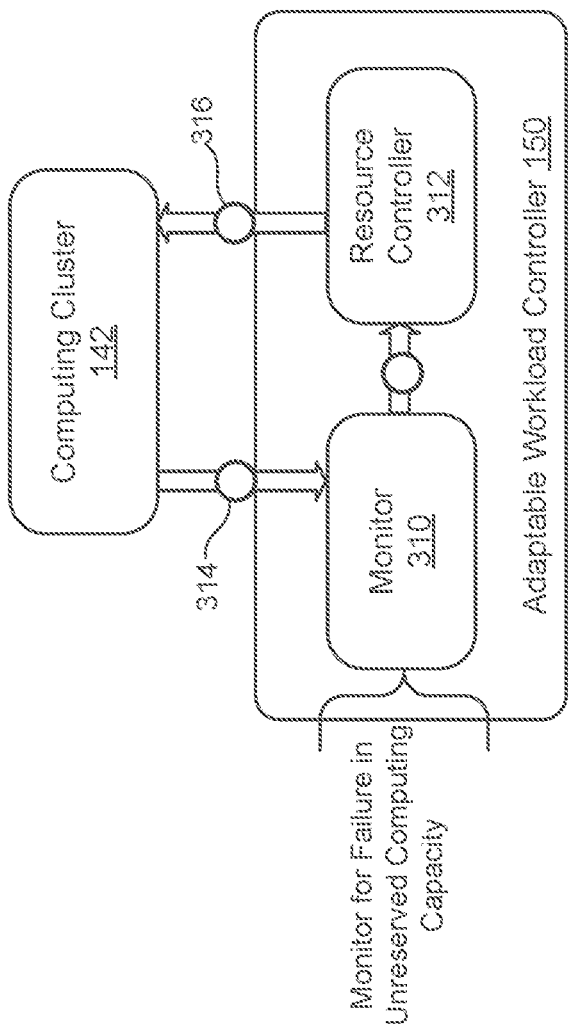
FIG. 3 is a schematic view of components monitoring for a failure of at least one of the computing clusters.

Referring now to FIG. 3, the adaptable workload controller 150, in some implementations, includes a monitor 310 and a resource controller 312. The monitor 310 monitors for a failure in the unreserved computing capacity 174 of the computing cluster 142 (e.g., during execution of the user workload 20). For example, the monitor 310 receives operation data 314 from the computing cluster 142 pertaining to the operation of the respective nodes 200. The failure may include hardware and/or software failures of the node 200 (e.g., any component that makes up the node 200) or of the network maintaining communication with the node 200.

When the monitor 310 detects a failure affecting the unreserved computing capacity 174 (i.e., the ability of the computing cluster 142 to provide the user 12 access to the entirety of the unreserved computing capacity 174), the resource controller 312 may designate at least a portion of the reserved computing capacity 172 as available for execution of the user workload 20. For example, the resource controller 312 sends a capacity adjustment command 316 to the computing cluster 142 to modify or adjust the designation of the reserved computing capacity 172 to make at least a portion of the reserved computing capacity 172 of the computing cluster 142 available for execution of the user workload 20. In some examples, the failure affecting the unreserved computing capacity 174 may result in the resource controller 312 sending a reprovisioning request to the adaptable workload controller 150. The reprovisioning request may reprovision the reserved and unreserved computing capacities 172, 174 of the respective nodes 200.

Figure 4:
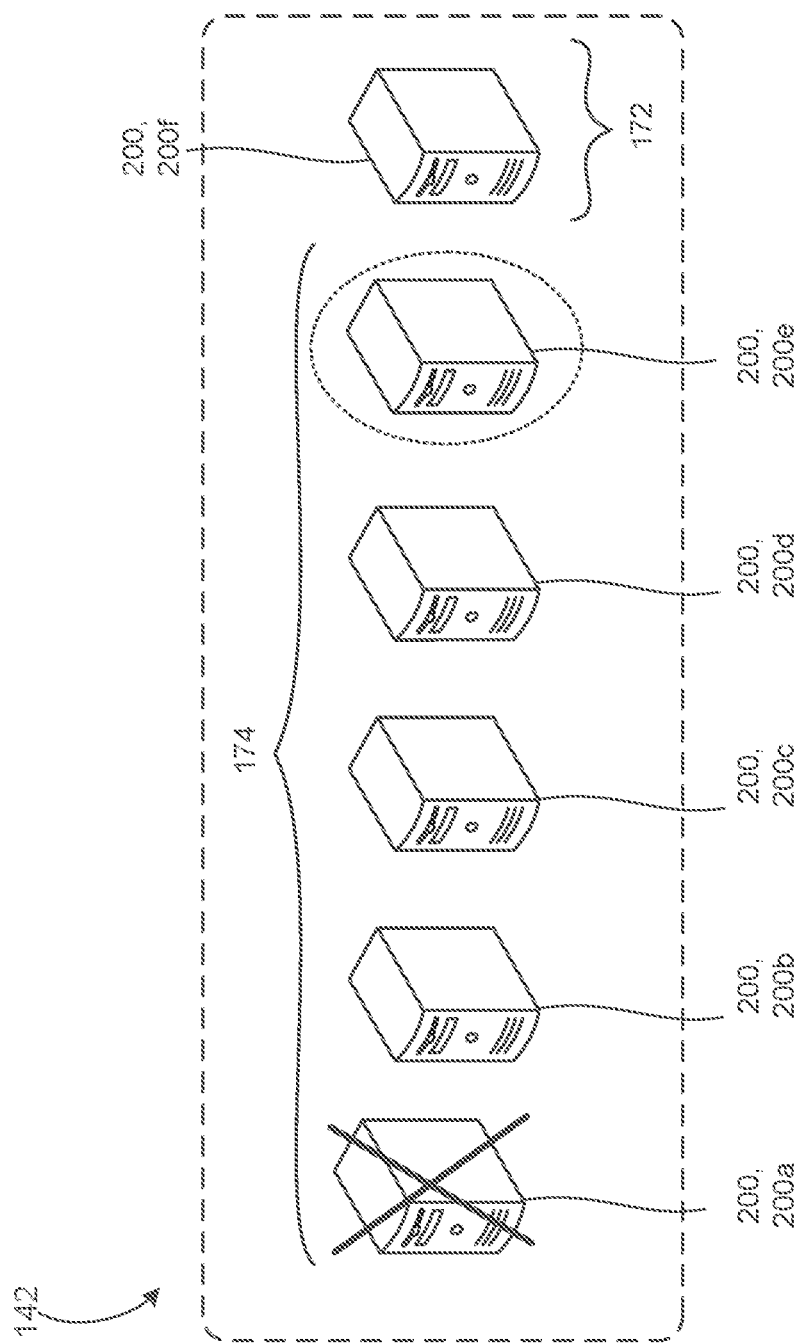
FIG. 4 is a schematic view of a node of a computing cluster experiencing failure.

Referring now to FIG. 4, in this example continued from FIG. 2A, the monitor 310 detects a failure of the node 200a. The resource controller 312, in response to the monitor 310 detecting the failure, removes the computing capacity limit from the node 200e to compensate for the failed node 200a, thus "restocking" the unreserved computing capacity 174 back to its initial capacity. That is, the resource controller 312 modifies the designation (e.g., removes the taint) of one of the nodes 200 (e.g., node 200e) that is currently designated as part of the reserved computing capacity 172. Here, the node 200e is identified with a dashed perimeter to indicate the change in designation from the reserved computing capacity 172 to the unreserved computing capacity 174. In this example, after the failure, five of the nodes 200a-e are designated as the unreserved computing capacity 174 (with the failed node 200a not contributing its respective maximum node computing capacity 210) and only one of the nodes 200f remains designated as the reserved computing capacity 172. It is also contemplated that the failure of one node 200a may result in the resource controller 312 adjusting the reserved computing capacity 172 of each of the nodes 200b-f individually to have a greater percentage of the unreserved computing capacity 174 relative to the originally designated unreserved computing capacity 174 (FIG. 2B).

Figure 5A:
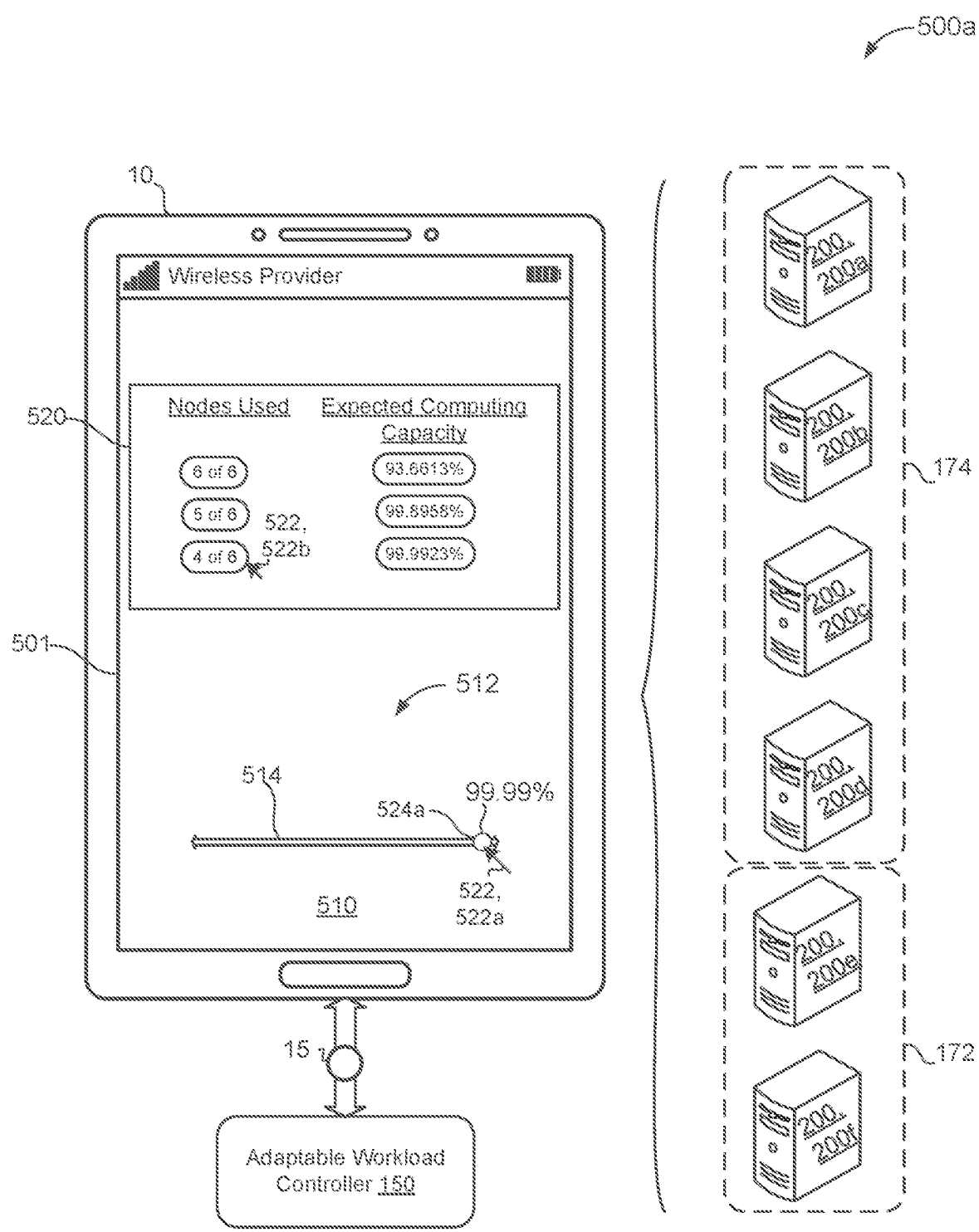
FIGS. 5A and 5B are schematic views of an example user device with a graphical user interface for adjusting the computing capacity of a computing cluster.

Referring now to FIG. 5A, a schematic view 500a includes the user device 10 executing a graphical user interface (GUI) 510 for display on a screen 501 of the user device 10. The GUI 510 enables the user 12 to interact with the adaptable workload controller 150 via the user device 10. The GUI 510 includes a graphical representation 512 of the threshold reliability 15 of the computing cluster 142, which depicts the threshold reliability 15 along a graphical axis 514. The user 12 may provide a user input indication (e.g., via touchscreen, voice commands, a mouse, a keyboard, etc.) to the GUI 510 indicating selection of a graphical element 522 to set a value of the threshold reliability 15 and cause the user device 10 to send the value of the threshold reliability 15 to the adaptable workload controller 150. For instance, the example shows the user providing a user input indication that sets the value of the threshold reliability 15 by manipulating a graphical slider 522, 522a to a first position 524a along the graphical axis 514. That is, movement by the graphical slider 522a in a first direction (relative to the schematic view 500a) along the graphical axis 514 may increase the value of the threshold reliability 15 while movement by the graphical slider 522a in an opposite second direction along the graphical axis 514 may decrease the value of the threshold reliability. In other examples, the user 12 may provide other types of user input indications indicating input/selection of other types of graphical elements 522 in order to set the value of the threshold reliability 15 such as via text boxes, buttons, dials, switches, etc.

For example, the GUI 510 includes (in addition to or alternative to the axis 514) a table 520 from which the user 12 selects the reserved computing capacity 172 and/or the threshold reliability 15 desired for operation of the computing clusters 142 by selecting a quantity of unreserved nodes 200. Here, the GUI 510 receives another user input indication indicating selection of another graphical element (e.g., button) 522, 522b within the table 520 that causes the GUI 510 to translate the graphical slider 522a along the graphical axis 514 of the graphical representation 512 from the first position 524a to a different position corresponding to an adjusted value of the threshold reliability 15. By way of example, the table 520 displayed in the GUI 510 depicts that selecting four nodes 200a-d as unreserved computing capacity 174 results in an expected computing capacity of 99.9923 percent while selecting five nodes 200a-e as the unreserved computing capacity 174 results in an expected computing capacity of 99.8958 percent. That is, but reserving less computing capacity, the estimated update decreases. It is also contemplated that the user 12 may manipulate the graphical slider 522a along the graphical axis 514 of the graphical representation 512 of the threshold reliability 15 to incrementally adjust the threshold reliability 15 by setting the second threshold reliability 518.

Figure 5B:
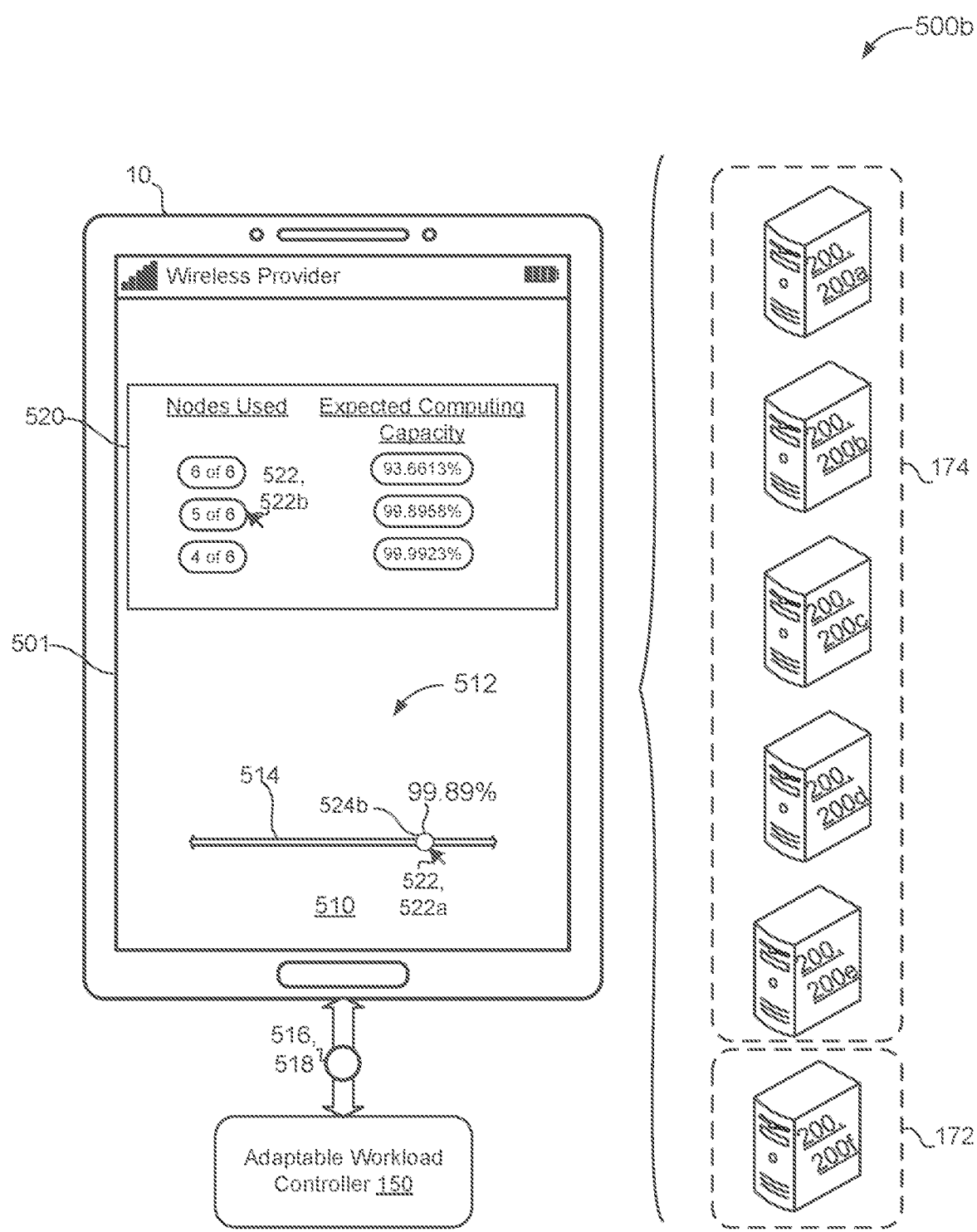

Referring now to FIG. 5B, a schematic view 500b continues the examples of FIG. 5A. Here, the user may provide an additional user input indication manipulating the graphical slider 522a and/or indicating selection of another graphical element 522b to adjust the value of the threshold reliability 15. For instance, the example shows a user providing the additional user input indication that sets an updated value of the threshold reliability 15 by manipulating the graphical slider 522a to a second position 524b along the graphical axis 514. That is, the user 12 manipulates the graphical slider 522a and or selects a graphical element 522b within the table 520 to change the position of the threshold reliability 15 from the first position 524a (FIG. 5A) to the second position 524b. The user device 10 transmits a threshold reliability update request 516 to the adaptable workload controller 150 that includes a second threshold reliability 518. The computing capacity module 170 adjusts the threshold reliability 15 based on the selected second threshold reliability 518. Stated differently, when determining the unreserved computing capacity 174 of the computing cluster 142, the computing capacity module 170 may receive the threshold reliability update request 516, including the second threshold reliability 518, from the user 12. Here, the user 12 can adjust the graphical representation 512 to translate the first position 524a to the second position 524b, which represents the second threshold reliability 518. Specifically, the user 12 manipulates a portion of the graphical representation 512 along the graphical axis 514, such that the graphical axis 514 and the graphical representation 512 of the threshold reliability 15 operate as a sliding scale. Here, the user 12 adjusted the threshold reliability from 99.99% uptime (FIG. 5A) to 99.89% uptime (FIG. 5B).

Figure 6:
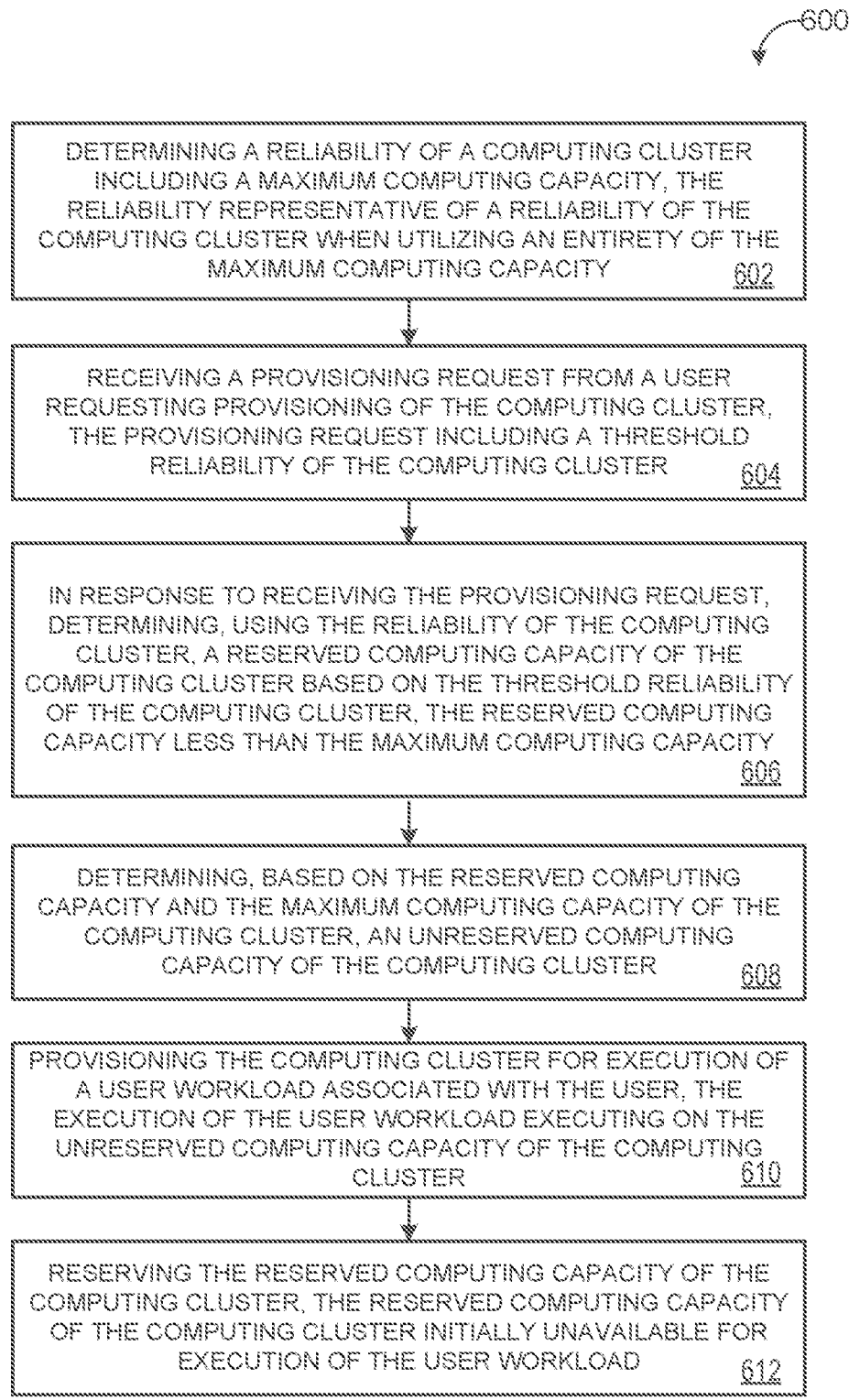
FIG. 6 a flowchart of an example arrangement of operations for a method of providing an adaptable workload system.

FIG. 6 is a flowchart of an exemplary arrangement of operations for a method 600 of an adaptable workload system. The computer-implemented method 600, when executed by data processing hardware 116, causes the data processing hardware 116 to perform operations. The method 600, at operation 602, includes determining a cluster reliability 162 of a computing cluster 142 including a maximum computing capacity. The cluster reliability 162 is representative of a cluster reliability 162 of the computing cluster 142 when utilizing an entirety of the maximum computing capacity. The method, at operation 604, includes receiving a provisioning request 14 from a user 12. The provisioning request 14 requests that the computing cluster 142 is provisioned and includes a threshold reliability 15 of the computing cluster 142. The method, at operation 606, in response to receiving the provisioning request 14, determines, using the cluster reliability 162 of the computing cluster 142, a reserved computing capacity 172 of the computing cluster 142 based on the threshold reliability 15. The reserved computing capacity 172 is less than the maximum computing capacity. The method, at operation 608, determines, based on the reserved computing capacity 172 and the maximum computing capacity of the computing cluster 142, an unreserved computing capacity 174 of the computing cluster. At operation 610, the method includes provisioning the computing cluster 142 for execution of a user workload 20 associated with the user. The execution of the user workload 20 is executed on the unreserved computing capacity 174 of the computing cluster 142. The method, at operation 612, includes reserving the reserved computing capacity 172 of the computing cluster 142. The reserved computing capacity 172 of the computing cluster 142 is initially unavailable for execution of the user workload 20.

Figure 7:
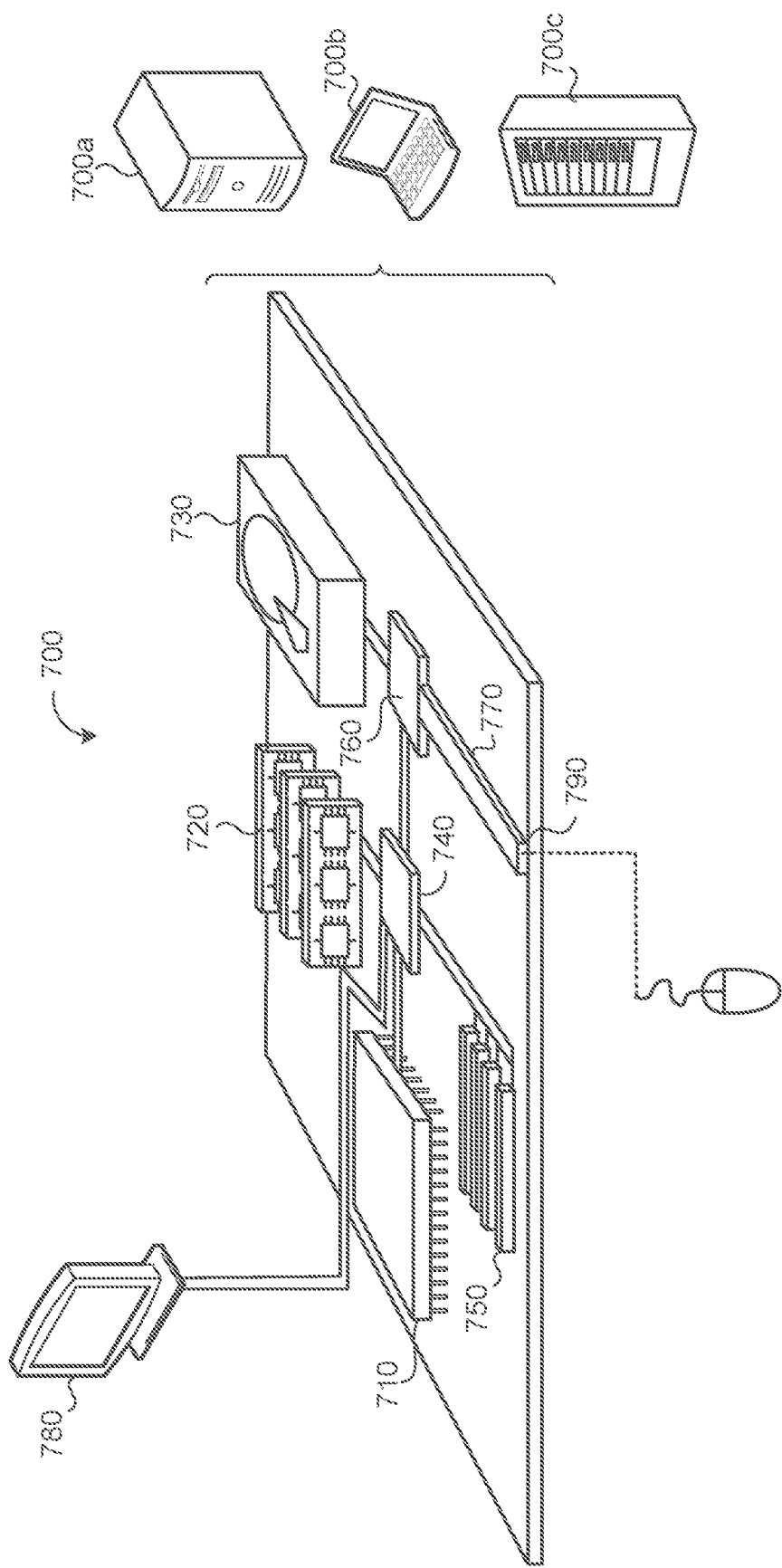
FIG. 7 is a schematic view of an example computing device that may be used to implement the systems and methods described herein.

FIG. 7 is a schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM. EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   receiving a cluster reliability of a computing cluster comprising a maximum computing capacity, the cluster reliability representative of a reliability of the computing cluster when utilizing an entirety of the maximum computing capacity;
   receiving a provisioning request from a user requesting provisioning of the computing cluster, the provisioning request comprising a user input indication indicating selection of a graphical element in a graphical user interface, the graphical element comprising a graphical slider that slides along a graphical axis to select a threshold reliability;
   in response to receiving the provisioning request, determining, using the cluster reliability of the computing cluster, a reserved computing capacity of the computing cluster based on the threshold reliability of the computing cluster, the reserved computing capacity less than the maximum computing capacity;
   determining, based on the reserved computing capacity and the maximum computing capacity of the computing cluster, an unreserved computing capacity of the computing cluster;
   provisioning the computing cluster for execution of a user workload associated with the user, the execution of the user workload executing on the unreserved computing capacity of the computing cluster; and
   reserving the reserved computing capacity of the computing cluster, the reserved computing capacity of the computing cluster initially unavailable for execution of the user workload.

2. The method of claim 1, wherein the threshold reliability comprises an uptime percentage of the computing cluster.

3. The method of claim 1, wherein the operations further comprise:
   detecting a failure of the computing cluster, the failure affecting the unreserved computing capacity of the computing cluster; and
   in response to detecting the failure, designating at least a portion of the reserved computing capacity as available for execution of the user workload.

4. The method of claim 1, wherein:
   the computing cluster comprises a plurality of components; and
   receiving the cluster reliability of the computing cluster comprises:
      for each respective component of the plurality of components, determining a respective component reliability; and
      aggregating each respective component reliability.

5. The method of claim 1, wherein determining the reserved computing capacity of the computing cluster comprises:
   receiving, from the user, a threshold reliability update request comprising a second threshold reliability; and
   adjusting the threshold reliability based on the second threshold reliability.

6. The method of claim 1, wherein the operations further comprise, after provisioning the computing cluster, monitoring for a failure affecting the unreserved computing capacity.

7. The method of claim 1, wherein:
   the computing cluster comprises a plurality of nodes; and
   reserving the reserved computing capacity of the computing cluster comprises tainting one or more nodes of the plurality of nodes.

8. The method of claim 1, wherein:
   the computing cluster comprises a plurality of nodes, each respective node of the plurality of nodes comprising a maximum node computing capacity; and
   reserving the reserved computing capacity of the computing cluster comprises establishing, for each respective node of the plurality of nodes, a computing capacity limit that is less than the maximum node computing capacity of the respective node.

9. The method of claim 8, wherein the operations further comprise:
   detecting a failure of one respective node of the plurality of nodes; and
   in response to detecting the failure, removing the computing capacity limit from at least one respective node of the plurality of nodes.

10. A system comprising:
    data processing hardware; and
    memory hardware in communication with the data processing hardware, the memory hardware storing instructions that when executed on the data processing hardware cause the data processing hardware to perform operations comprising:
       receiving a cluster reliability of a computing cluster comprising a maximum computing capacity, the cluster reliability representative of a reliability of the computing cluster when utilizing an entirety of the maximum computing capacity;
       receiving a provisioning request from a user requesting provisioning of the computing cluster, the provisioning request comprising a user input indication indicating selection of a graphical element in a graphical user interface, the graphical element comprising a graphical slider that slides along a graphical axis to select a threshold reliability;
       in response to receiving the provisioning request, determining, using the cluster reliability of the computing cluster, a reserved computing capacity of the computing cluster based on the threshold reliability of the computing cluster, the reserved computing capacity less than the maximum computing capacity;
       determining, based on the reserved computing capacity and the maximum computing capacity of the computing cluster, an unreserved computing capacity of the computing cluster;
       provisioning the computing cluster for execution of a user workload associated with the user, the execution of the user workload executing on the unreserved computing capacity of the computing cluster; and
       reserving the reserved computing capacity of the computing cluster, the reserved computing capacity of the computing cluster initially unavailable for execution of the user workload.

11. The system of claim 10, wherein the threshold reliability comprises an uptime percentage of the computing cluster.

12. The system of claim 10, wherein the operations further comprise:

detecting a failure of the computing cluster, the failure affecting the unreserved computing capacity of the computing cluster; and in response to detecting the failure, designating at least a portion of the reserved computing capacity as available for execution of the user workload.

13. The system of claim 10, wherein:

the computing cluster comprises a plurality of components; and receiving the cluster reliability of the computing cluster comprises:

for each respective component of the plurality of components, determining a respective component reliability; and aggregating each respective component reliability.

14. The system of claim 10, wherein determining the reserved computing capacity of the computing cluster comprises:

receiving, from the user, a threshold reliability update request comprising a second threshold reliability; and adjusting the threshold reliability based on the second threshold reliability.

15. The system of claim 10, wherein the operations further comprise, after provisioning the computing cluster, monitoring for a failure affecting the unreserved computing capacity.

16. The system of claim 10, wherein:

the computing cluster comprises a plurality of nodes; and reserving the reserved computing capacity of the computing cluster comprises tainting one or more nodes of the plurality of nodes.

17. The system of claim 10, wherein:

the computing cluster comprises a plurality of nodes, each respective node of the plurality of nodes comprising a maximum node computing capacity; and reserving the reserved computing capacity of the computing cluster comprises establishing, for each respective node of the plurality of nodes, a computing capacity limit that is less than the maximum node computing capacity of the respective node.

18. The system of claim 17, wherein the operations further comprise:

detecting a failure of one respective node of the plurality of nodes; and in response to detecting the failure, removing the computing capacity limit from at least one respective node of the plurality of nodes.

\* \* \* \* \*